(12) United States Patent  (10) Patent No.: US 7,474,957 B2
Matsumoto et al.  (45) Date of Patent: Jan. 6, 2009

(54) DRIVING ASSISTANCE SYSTEM

(75) Inventors: Yuji Matsumoto, Chiryu (JP); Ichiro Yoshida, Takahama (JP)

(73) Assignee: Denso Corporation, Kariya (JP)

( * ) Notice: Subject to any disclaimer, the term of this patent is extended or adjusted under 35 U.S.C. 154(b) by 769 days.

(21) Appl. No.: 11/125,417

(22) Filed: May 10, 2005

(65) Prior Publication Data

US 2005/0267671 A1    Dec. 1, 2005

(30) Foreign Application Priority Data

May 12, 2004  (JP) .............................. 2004-142298
Oct. 28, 2004  (JP) .............................. 2004-314007

(51) Int. Cl.
    *G06F 19/00*    (2006.01)
(52) U.S. Cl. ........................... 701/117; 701/36; 701/49; 701/301
(58) Field of Classification Search .................. 701/36, 701/45, 49, 200–213, 300–302, 117
    See application file for complete search history.

(56) References Cited

U.S. PATENT DOCUMENTS 7,057,505 B2    6/2006  Iwamoto
7,369,042 B2 *  5/2008  Osaka et al. ................. 340/435
7,391,304 B2 *  6/2008  Kataoka et al. ............. 340/435
7,418,346 B2 *  8/2008  Breed et al. ................. 701/301

FOREIGN PATENT DOCUMENTS

JP    A-05-273912    10/1993
JP    A-09-132094    5/1997
JP    A-2000-272414  10/2000

OTHER PUBLICATIONS

Office Action mailed Jun. 24, 2008 in corresponding Japanese Patent Application No. 2004-314007 (and English translation).

* cited by examiner

*Primary Examiner*—Richard M. Camby
(74) *Attorney, Agent, or Firm*—Posz Law Group, PLC

(57) ABSTRACT

A driving assistance system able to suitably inform a user of the occurrence of congestion or an accident or other situation which may obstruct the advance of one's own vehicle and accordingly able to suitably assist driving, that is, a driving assistance system which judges whether or not congestion, an accident, etc. has occurred in a direction of advance of the vehicle on the basis of road information transmitted from a road information center and the current location of the vehicle and changes an operating force of a direction instruction operation lever in the corresponding direction of advance when detecting the occurrence of congestion, an accident, etc. in the direction of advance of the vehicle. By the change of the operating force of the direction instruction operation lever, the occurrence of congestion, an accident, etc. in the direction of advance of the vehicle can be tactilely informed to the user via the direction instruction operation lever when the user tries to operate the direction instruction operation lever.

8 Claims, 13 Drawing Sheets

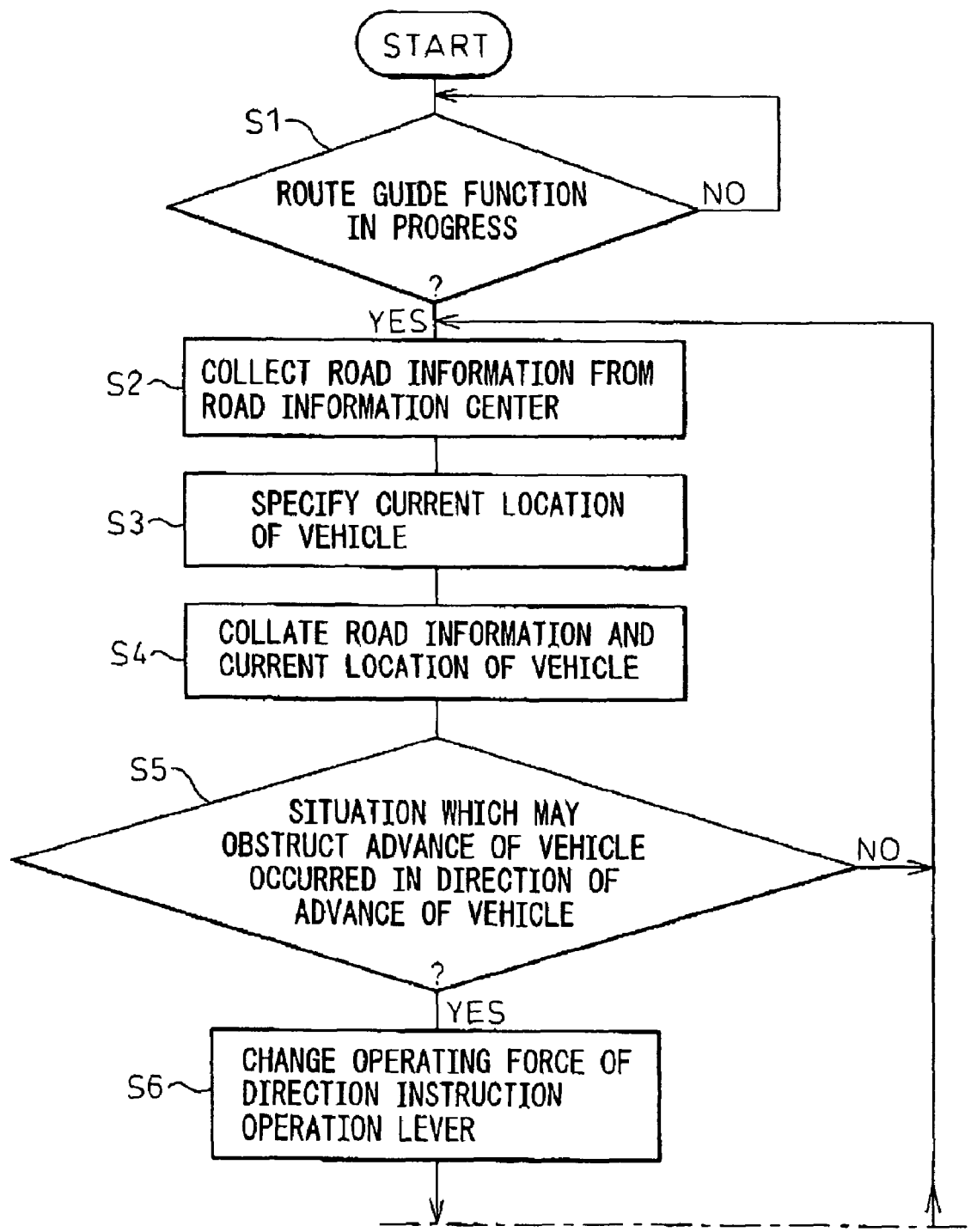

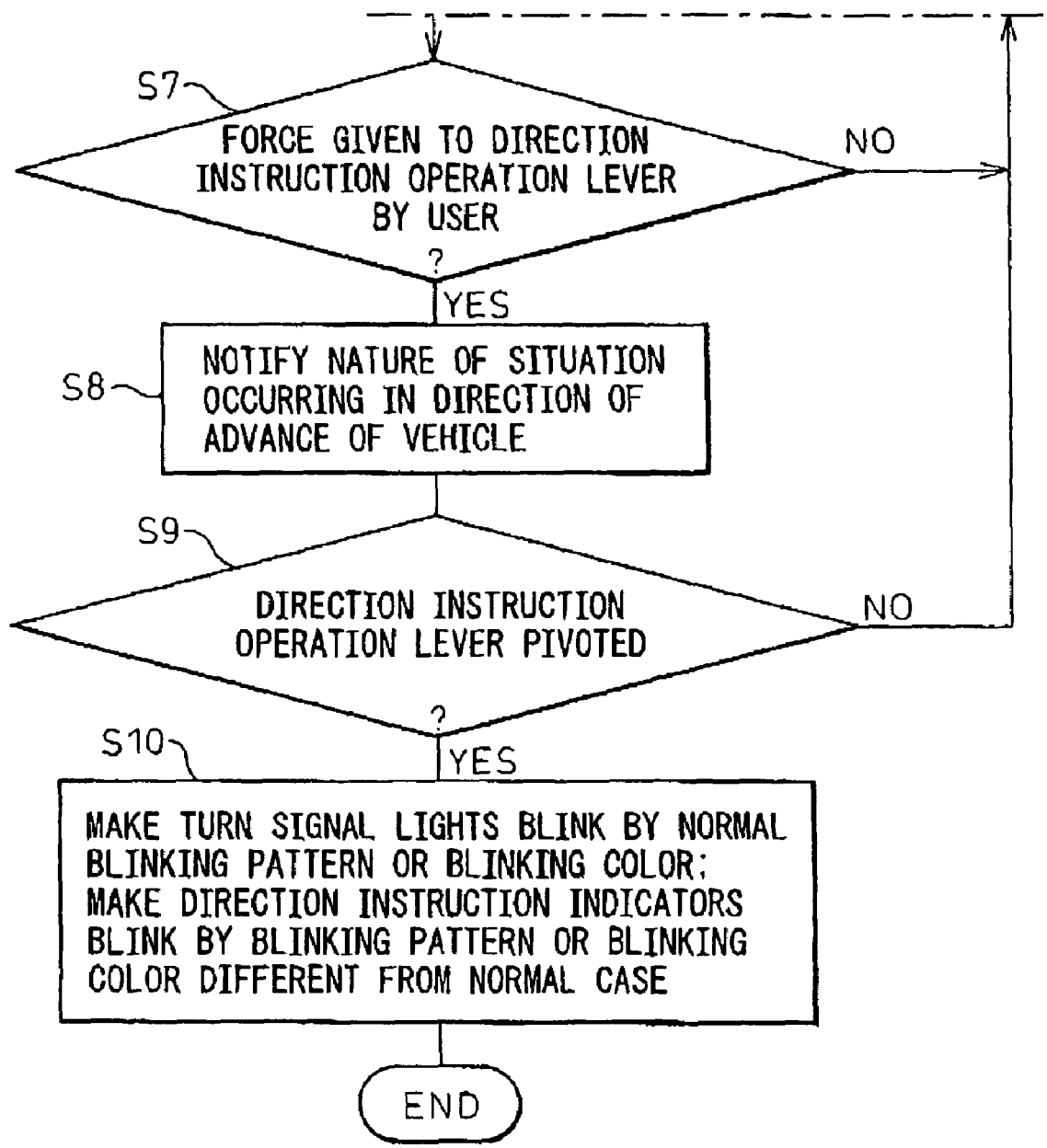

FIG. 3
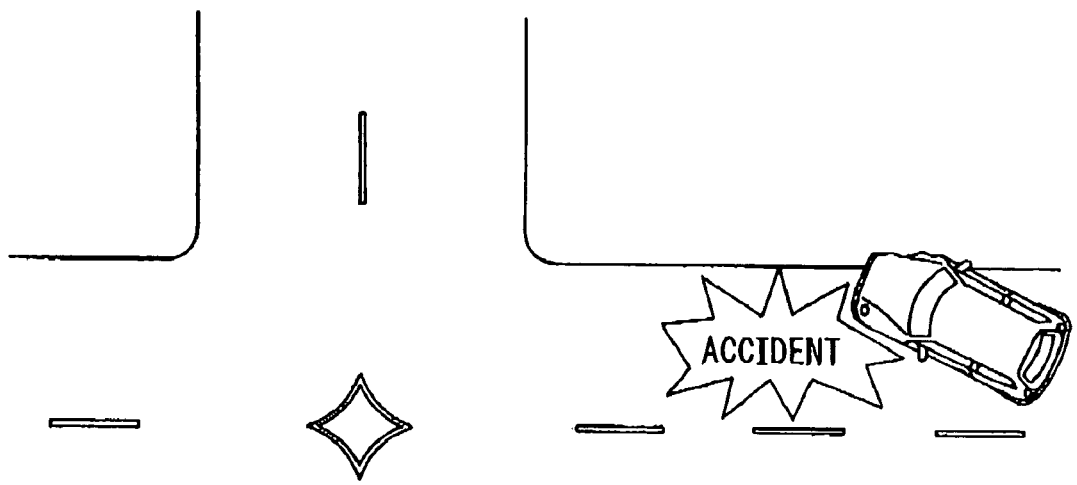
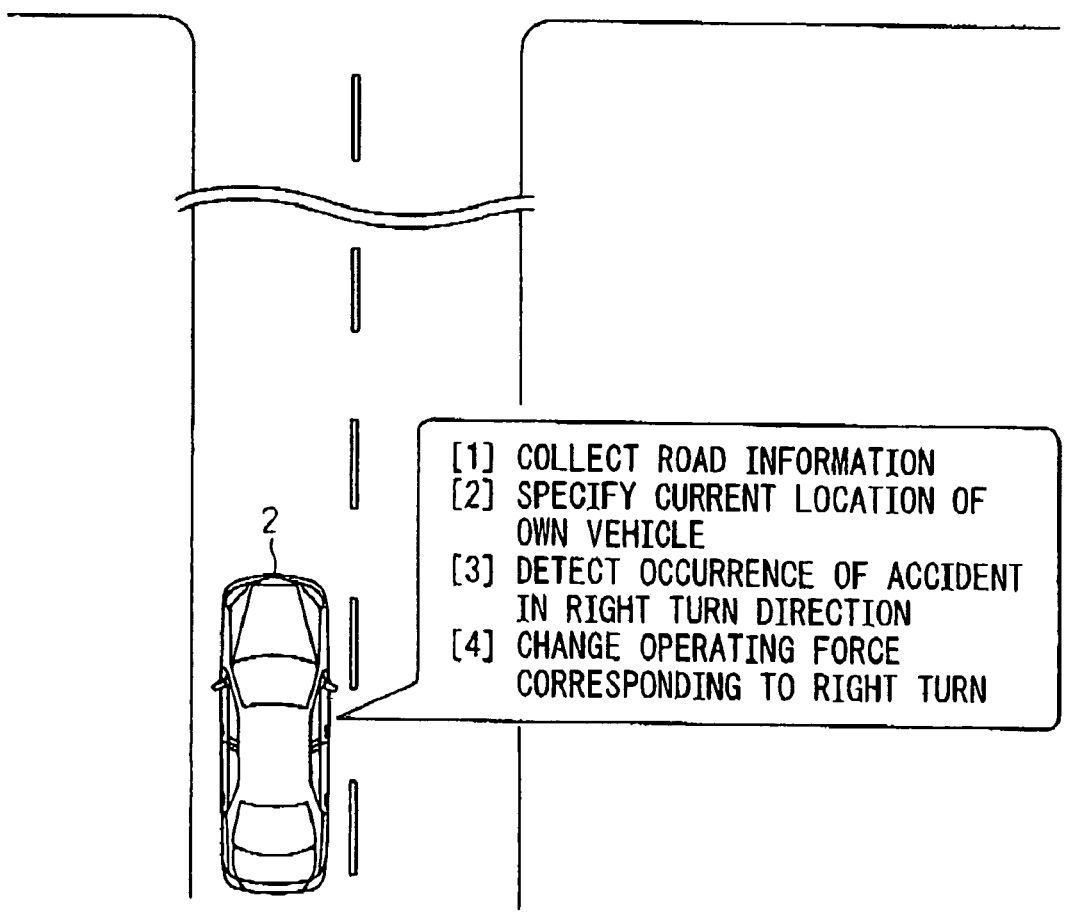

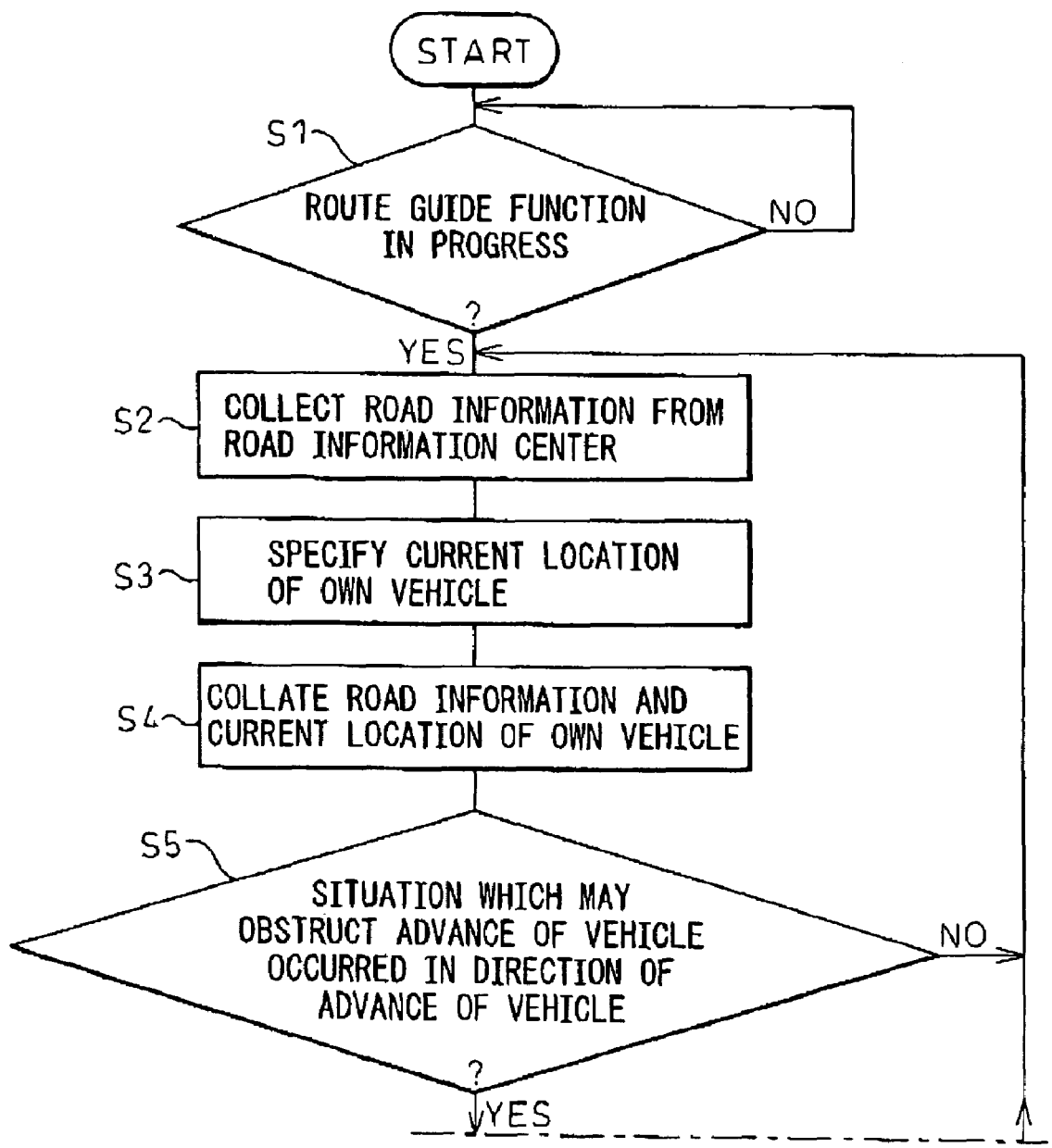

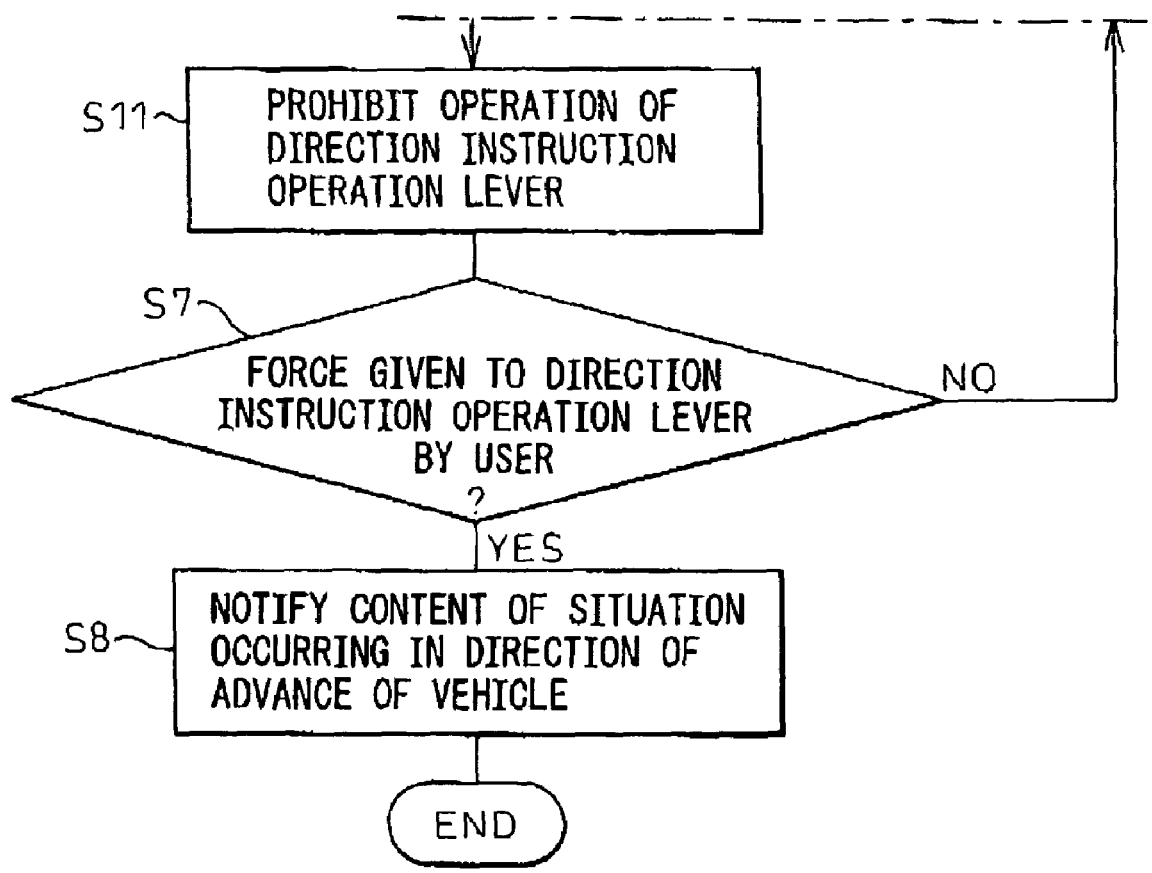

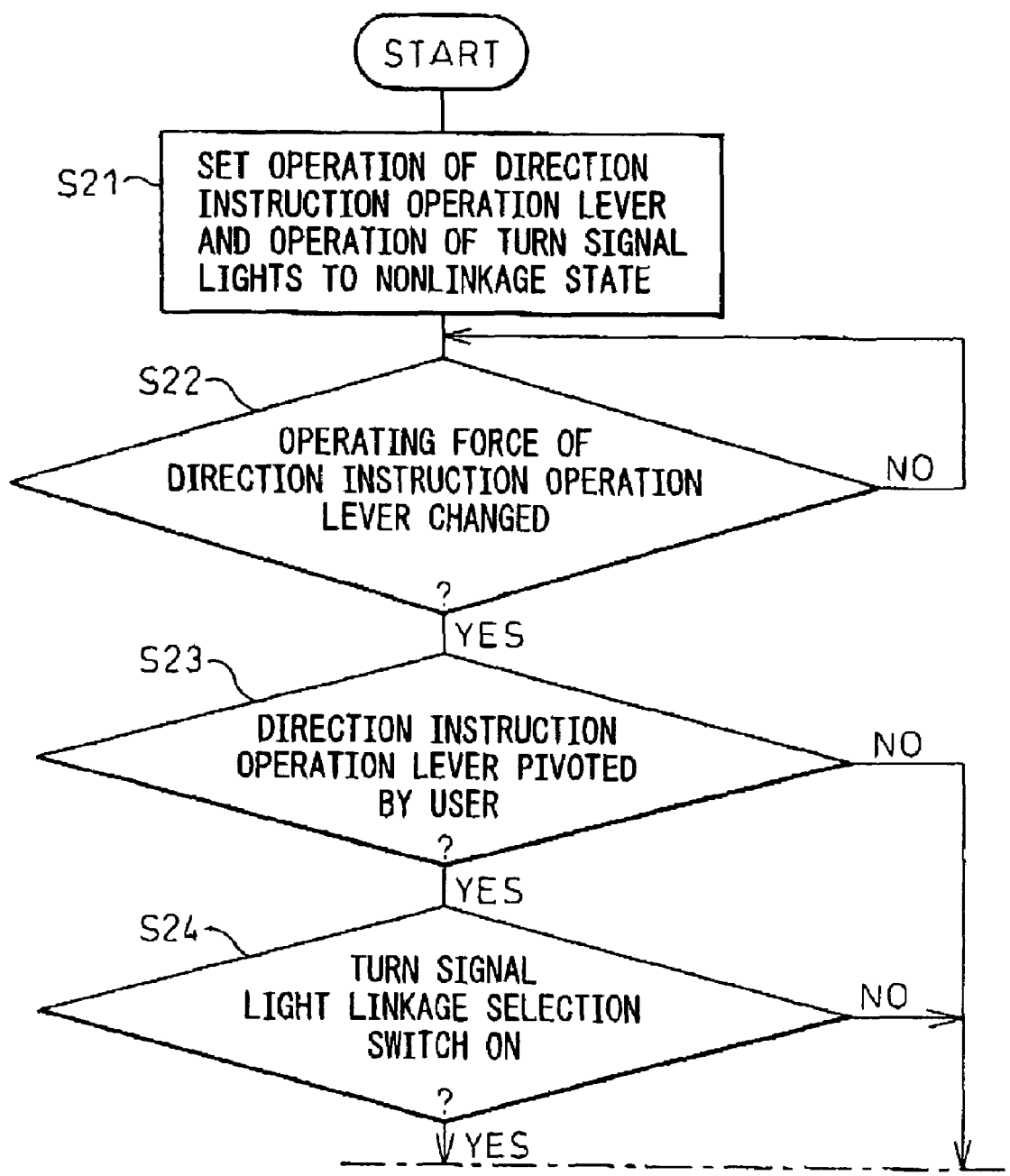

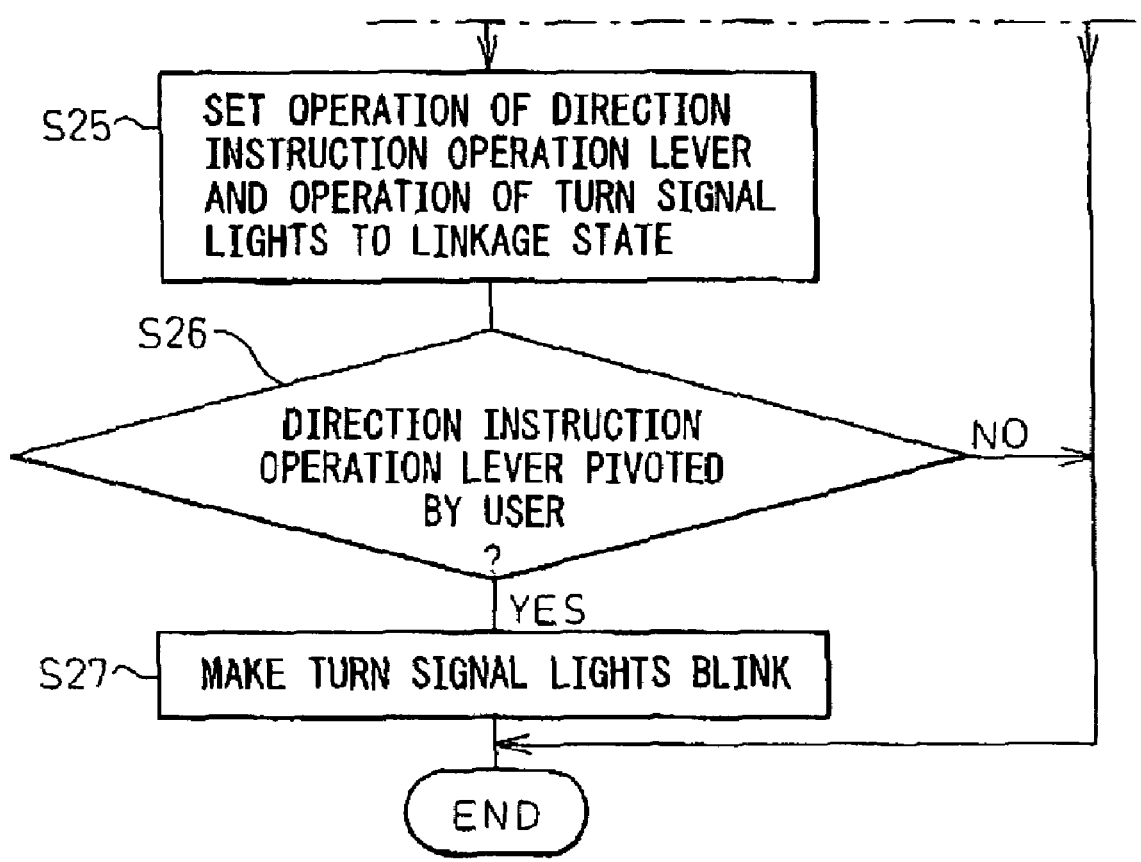

DRIVING ASSISTANCE SYSTEM

BACKGROUND OF THE INVENTION

1. Field of the Invention

The present invention relates to a driving assistance system provided with a road information receiving means for receiving road information transmitted from a road information center or another vehicle and a current location specifying means for specifying the current location of one's own vehicle.

2. Description of the Related Art

In car navigation systems, there are systems informing the user (driver) of the occurrence of congestion, accidents, etc. by for example changing a display color of a corresponding road on a map or transmitting audio guidance when receiving the road information (congestion information, accident information, etc.) transmitted from the road information center.

However, this is a method informing the user of the occurrence of congestion, an accident, etc. by just displaying it or transmitting the audio guidance, therefore the user must view the road information displayed on a display device or listening to the road information output from an audio output device in order to understand it. That is, in other words, when the user is not paying attention, he or she will sometimes miss viewing or miss listening to the road information, so there arises a problem that the user will miss taking suitable action to avoid the congestion, accident, etc.

SUMMARY OF THE INVENTION

An object of the present invention is to provide a driving assistance system able to suitably inform a user of the occurrence of congestion or an accident or other situation which may obstruct the advance of his/her vehicle and accordingly able to suitably assist driving.

To attain the above object, there is provided a driving assistance system which judges whether or not congestion, an accident, etc. has occurred in a direction of advance of one's own vehicle on the basis of road information transmitted from a road information center and the current location of the vehicle and changes an operating force of a direction instruction operation lever in the corresponding direction of advance when detecting the occurrence. By the change of the operating force of the direction instruction operation lever, the occurrence can be tactilely informed to the user via the direction instruction operation lever when the user tries to operate the direction instruction operation lever.

BRIEF DESCRIPTION OF THE DRAWINGS

The above objects and features of the present invention will be more apparent from the following description of the preferred embodiments given with reference to the accompanying drawings, wherein:

FIGS. 2A and 2B are flow charts showing processing conducted by a controller;

FIG. 3 is a diagram showing a first part of an example of a mode of change of an operating force of a direction instruction operation lever;

FIGS. 6A and 6B are flow charts showing processing conducted by the controller;

FIGS. 8A and 8B are flow charts showing processing conducted by the controller;

DESCRIPTION OF THE PREFERRED EMBODIMENTS

Figure 1:
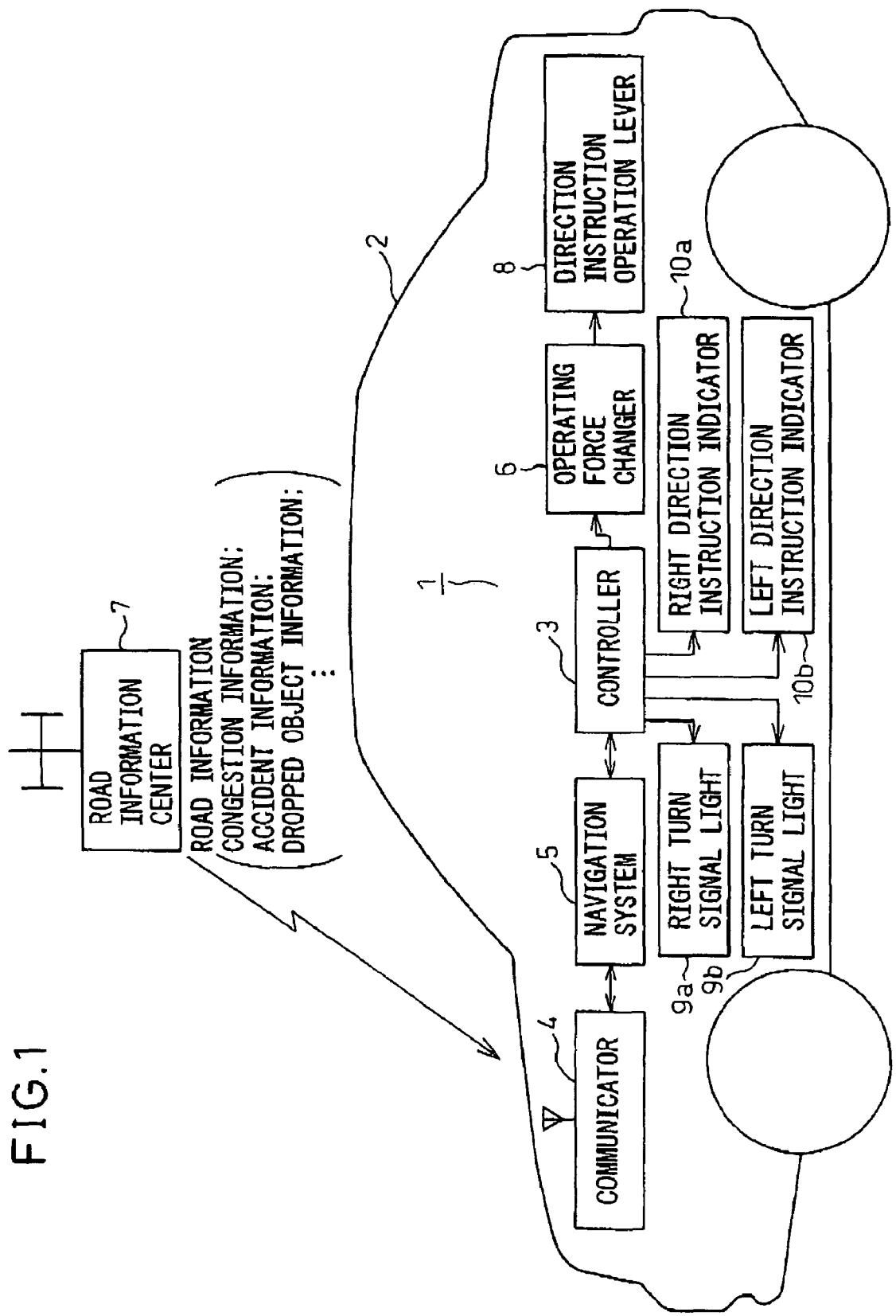
FIG. 1 is a diagram schematically showing an overall configuration of a first embodiment of the present invention.

Preferred embodiments of the present invention will be described in detail below while referring to the attached FIG. 1 to FIGS. 10A to 10D.

According to a first aspect of the present invention, when a road information receiving means receives road information (congestion information, accident information, etc.) transmitted from a road information center or other vehicle and a current location specifying means specifies the current location of one's own vehicle, a controlling means judges whether or not a situation which may obstruct the advance of the vehicle has occurred in the direction of advance of the vehicle on the basis of the road information and the current location of the vehicle and, when detecting the occurrence, changes the operating force of the direction instruction operation lever in the corresponding direction of advance by the operating force changing means.

Due to this, when congestion, an accident, or another situation which may obstruct the advance of one's own vehicle occurs in the direction of advance of the vehicle, the change of the operating force of the direction instruction operation lever enables that occurrence to be tactilely informed to the user via the direction instruction operation lever when the user tries to operate the direction instruction operation lever, so driving can be suitably assisted.

According to a second aspect of the invention, the controlling means judges whether or not force was applied to the direction instruction operation lever by the user after the operating force changing means changes the operating force of the direction instruction operation lever to the corresponding direction of advance and, when detecting that force is given to the direction instruction operation lever by the user, notifies the user of nature of the situation which may obstruct the advance of the vehicle occurring in the direction of advance of the vehicle from a notifying means. Due to this, the reason (for example due to congestion or due to an accident) of the change of the operating force of the direction instruction operation lever can be informed to the user and further the fact that the change of the operating force of the direction instruction operation lever is not due to a breakdown can be informed to the user.

According to a third aspect of the invention, the controlling means judges whether or not the direction instruction operation lever was pivoted to a direction corresponding to the corresponding direction of advance after the operating force changing means changes the operating force of the direction instruction operation lever in the corresponding direction of advance and, when detecting that the direction instruction operation lever was so pivoted, makes direction instruction indicators blink according to a blinking cycle or a blinking color different from that in a normal state. Due to this, irrespective of the change of the operating force of the direction instruction operation lever, even when the user pivots the direction instruction operation lever, the occurrence of a situation which may obstruct the advance of the vehicle in the direction of advance of the vehicle can be tactilely informed to the user by making the direction instruction indicators blink according to a blinking cycle or a blinking color different from that in the normal state after that.

According to a fourth aspect of the invention, the controlling means can change the operating force in accordance with a degree of importance or a degree of emergency of a factor hindering the advance of one's own vehicle occurring in the direction of advance of the vehicle. Due to this, for example, it is possible to make an amount of change of the operating force small in a case where the degree of importance or the degree of emergency is low, while make the amount of change of the operating force large in a case where the degree of importance or the degree of emergency is high so as to inform the degree of importance or the degree of emergency of the factor to the user by the magnitude of the amount of change of the operating force.

According to a fifth aspect of the invention, when road information (congestion information, accident information, etc.) transmitted from a road information center or other vehicle is received at a road information receiving means and the current location of one's own vehicle is specified by a current location specifying means, the controlling means judges whether or not a situation which may obstruct the advance of the vehicle has occurred in the direction of advance of the vehicle on the basis of the road information and the current location of the vehicle and, when detecting the occurrence of such a situation, makes an operation prohibiting means prohibit the operation of the direction instruction operation lever in the corresponding direction of advance.

Due to this, when congestion, an accident, or another situation which may obstruct the advance of one's own vehicle occurs in the direction of advance of the vehicle, prohibition of the operation of the direction instruction operation lever, in the same way as described in the first aspect, enables the occurrence of such a situation to be tactilely informed to the user via the direction instruction operation lever when the user tries to operate the direction instruction operation lever, so driving can be suitably assisted.

According to a sixth aspect of the invention, when detecting that force was given to the direction instruction operation lever by the user after prohibiting the operation of the direction instruction operation lever in the corresponding direction of advance by the operation prohibiting means, the controlling means makes the notifying means notify the user of the nature of the situation which may obstruct the advance of the vehicle occurring in the direction of advance of the vehicle. Due to this, the reason of the prohibition of the operation of the direction instruction operation lever (for example due to congestion or due to an accident) can be informed to the user and the fact that the prohibition of the operation of the direction instruction operation lever was not due to a breakdown can be informed to the user.

According to a seventh aspect of the invention, the controlling means sets the operation of the direction instruction operation lever and the operation of turn signal lights to a nonlinkage state when detecting selection of nonlinkage between the operation of the direction instruction operation lever and the operation of turn signal lights by the user by a selecting means, while sets the operation of the direction instruction operation lever and the operation of turn signal lights to a linkage state when detecting selection of linkage of the operation of the direction instruction operation lever and the operation of turn signal lights by the user by the selecting means.

Due to this, when nonlinkage between the operation of the direction instruction operation lever and the operation of the turn signal lights is selected by the user, the turn signal lights will not operate (blink) even when the user operates the direction instruction operation lever, therefore even when the user recognizes the occurrence of congestion, an accident, or another situation which may obstruct the advance of one's own vehicle in the direction of advance of the vehicle and therefore does not turn right/left or change the lane, giving erroneous information to the surroundings can be avoided in advance, so safety with the surroundings can be suitably secured.

According to an eighth aspect of the invention, a force detecting means detects a magnitude of the amount of force or duration of application of the force given to the direction instruction operation lever by the user, and the controlling means changes the operating force in accordance with the magnitude of the factor which may obstruct the advance of the vehicle occurring in the direction of advance of the vehicle and, at the same time, controls the operation of the turn signal lights on the basis of the results of results by the force detecting means described before.

Due to this, when changing the operating force to become large when the size of the congestion, accident, etc. occurring in the direction of advance of one's own vehicle is large, the amount of the force given to the direction instruction operation lever by the user becomes large or the duration of application becomes long. Therefore, by speeding up the blinking cycle or changing the blinking color in accordance with the large amount of force or long duration of application, it can be informed to the surroundings that the size of the congestion, accident, etc. is large. Further, when changing the operating force to become small when the size of the congestion, accident, etc. occurring in the direction of advance of one's own vehicle is small, the amount of the force given to the direction instruction operation lever by the user becomes small or the duration of application becomes short. Therefore, by slowing down the blinking cycle slow or changing the blinking color in accordance with the small amount of force or short duration of application, it can be informed to the surroundings that the size of the congestion, accident, etc. is small.

Below, embodiments of the present invention will be explained with reference to the drawings.

FIRST EMBODIMENT

Below, a first embodiment of the present invention will be explained by referring to FIG. 1 to FIG. 4. FIG. 1 schematically shows the overall configuration of a driving assistance system. A driving assistance system 1 is mounted on a vehicle 2 and provided with a controller 3 (i.e., the controlling means referred to in the present invention), a communicator 4 (i.e., the road information receiving means referred to in the present invention), a navigation system 5 (i.e., the notifying means referred to in the present invention), and an operating force changer 6 (i.e., the operating force changing means referred to in the present invention).

The controller 3 is provided with a central processing unit (CPU), random access memory (RAM), read only memory (ROM), input/output (I/O) bus, etc. and controls the overall operation of the driving assistance system 1. The communicator 4 performs broad band wireless communication with a road information center 7 through a broad band wireless communication network. When receiving road information transmitted from the road information center 7, it outputs the received road information to the controller 3 through the navigation system 5. Note that the "road information"

referred to here means congestion information, accident information, dropped object information, etc. Further, the road information center 7 may be configured so as to periodically transmit the road information irrespective of occurrence of congestion, accidents, etc. as well or may be configured so as to irregularly transmit the road information in accordance with congestion, accidents, etc.

The navigation system 5 computes the current location of the vehicle and outputs the same to the controller 3. The operating force changer 6 changes the operating force of a direction instruction operation lever 8 disposed at the side of the steering wheel on the basis of an input operating force change signal when such an operating force change signal is input from the controller 3.

The controller 3 makes a right turn signal light 9a blink and makes a right direction instruction indicator 10a blink when the direction instruction operation lever 8 is pivoted from a neutral position to a right turn position (generally, when the direction instruction operation lever 8 is pivoted in a downward direction in a right-side steering wheel car) and makes the blinking of the right turn signal light 9a stop and makes the blinking of the right direction instruction indicator 10a stop when the direction instruction operation lever 8 is returned to the neutral position from the right turn position after that. Further, the controller 3 makes a left turn signal light 9b blink and makes a left direction instruction indicator 10b blink when the direction instruction operation lever 8 is pivoted from the neutral position to a left turn position (generally, when the direction instruction operation lever 8 is pivoted in an upward direction in a right-side steering wheel car) and makes the blinking of the left turn signal light 9b stop and makes the blinking of the left direction instruction indicator 10b stop when the direction instruction operation lever 8 is returned to the neutral position from the left turn position after that.

Next, the action of the above configuration will be explained by referring to FIGS. 2A and 2B to FIG. 4. Here, FIGS. 2A and 2B show the processing conducted by the controller 3 as flow charts. Note that, here, an explanation will be given assuming provision of a route guide function by the car navigation system 5.

When the route guide function by the car navigation system 5 is in progress ("YES" at step S1), the controller 3, successively collects the road information transmitted from the road information center 7 by the broad band wireless communication and received at the communicator 4 (step S2) and successively specifies the current location of the vehicle by the car navigation system 5 (step S3). Then, the controller 3 compares the road information transmitted from the road information center 7 and the current location of the vehicle (step S4) and judges whether or not a situation which may obstruct the advance of the vehicle (congestion, an accident, etc.) has occurred in the direction of advance of the vehicle (step S5).

Here, when detecting the occurrence of such a situation ("YES" at step S5), the controller 3 outputs an operating force change signal to the operating force changer 6 and changes the operating force of the direction instruction operation lever 8 in the corresponding direction of advance (step S6).

Figure 4:
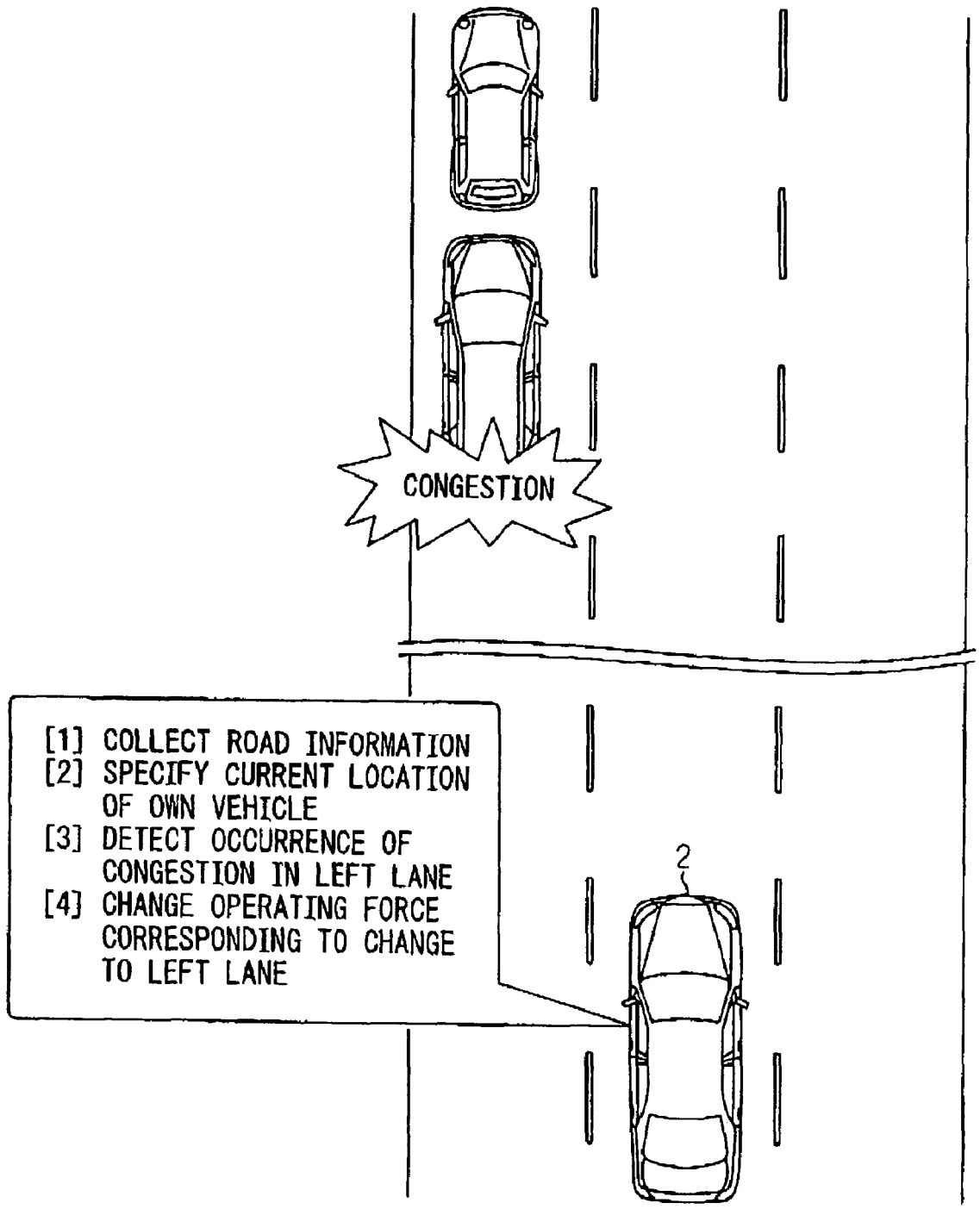
FIG. 4 is a diagram showing a second part of an example of a mode of change of an operating force of a direction instruction operation lever.

Specifically explaining this, as shown in FIG. 3, when detecting the occurrence of an accident at a location at a right turn from an intersection when viewed from one's own vehicle where approaching the intersection, the controller 3 changes the operating force corresponding to the right turn of the direction instruction operation lever 8 to become large. Further, as shown in FIG. 4, when detecting the occurrence of congestion at a location at a change to a left lane when viewed from one's own vehicle when driving in the center lane of a three-lane road, the controller 3 changes the operating force of the direction instruction operation lever 8 corresponding to the left lane change of the direction instruction operation lever 8 to become large.

Subsequently, the controller 3 judges whether or not a force was given to the direction instruction operation lever 8 by the user (driver) after the change of the operating force of the direction instruction operation lever 8 in this way (step S7 in FIG. 2B). When detecting that the force was given to the direction instruction operation lever 8 by the user ("YES" at step S7), it makes for example the display device of the navigation system 5 display the nature of the situation occurring in the direction of advance of the vehicle or makes the audio output device output audio guidance (step S8).

Specifically explaining this, in the case shown in FIG. 3, when detecting that force to the right turn direction was given to the direction instruction operation lever 8 by the user after changing the operating force corresponding to a right turn of the direction instruction operation lever 8 to become large, the controller 3 makes the audio output device of the navigation system 5 output audio guidance, for example, "an accident has occurred in the right turn direction" to notify the user of the occurrence of an accident at the location of the right turn from the intersection when viewed from the vehicle.

Due to this, when the user tries to pivot the direction instruction operation lever 8 from the neutral position to the right turn position in order to turn right at the intersection, he/she can tactilely learn of the occurrence of a certain situation in the right turn direction due to the large change of the operating force corresponding to the right turn of the direction instruction operation lever 8 and further can audibly learn of the occurrence of the accident in the right turn direction due the output of the audio guidance.

Further, in the case shown in FIG. 4, when detecting that force to the left turn direction was given to the direction instruction operation lever 8 by the user after a large change of the operating force corresponding to a left lane change of the direction instruction operation lever 8, the controller 3 makes the audio output device of the navigation system 5 output the audio guidance of for example "congestion has occurred in the left lane change direction" to notify the user of the occurrence of congestion at the location of change to the left lane when viewed from the vehicle.

Due to this, when the user tries to pivot the direction instruction operation lever 8 from the neutral position to the left turn position in order to change to the left lane, he/she can tactilely learn that a certain situation has occurred in the left lane change direction due to the large change of the operating force corresponding to the left lane change of the direction instruction operation lever 8 and further can learn of the occurrence of congestion in the left lane change direction due to the output of the audio guidance.

Then, the controller 3 judges whether or not the direction instruction operation lever 8 was pivoted irrespective of the change of the operating force (step S9) and, when detecting the pivoting of the direction instruction operation lever 8 ("YES" at step S9), makes the right turn signal light 9a or the left turn signal light 9b blink and makes the right direction instruction indicator 10a or the left direction instruction indicator 10b blink in accordance with the pivot direction thereof (step S10).

In this case, the controller 3 makes the right turn signal light 9a or the left turn signal light 9b blink according to the ordinary blinking cycle or blinking color, while makes the right direction instruction indicator 1a or the left direction instruction indicator 10b blink according to a blinking cycle or blinking color different from that in the normal state, for example, speeds up the blinking cycle or makes a red color blink. Due to this, the user can visually learn the occurrence of congestion, an accident, etc. in the direction of advance of the vehicle due to the blinking of the right direction instruction indicator 10*a* or the left direction instruction indicator 10*b* according to the blinking cycle or blinking color different from that of the normal state even after the pivoting of the direction instruction operation lever.

Above, the explanation was given of the case of judging whether congestion, an accident, etc. occurred by utilizing road information transmitted from the road information center 7 by the broad band wireless communication in the driving assistance system 1, but it is also possible to perform the above series of operations by utilizing the road information transmitted from another vehicle by narrow band wireless communication so long as one's own vehicle is able to perform narrow band wireless communication (inter-vehicle communication) through a narrow band wireless communication network with for example another vehicle driving in parallel or another vehicle stopped at an intersection. Further, it is also possible to configure the system so that the amount of change of the operating force is made small when the degree of importance or the degree of the emergency is low and so that the amount of change of the operating force is made large when the degree of importance or the degree of emergency is high in accordance with the degree of importance or the degree of emergency of the congestion, accident, etc.

As explained above, according to the first embodiment, the driving assistance system 1 is configured so that, when detecting the occurrence of congestion, an accident, etc. in the direction of advance of one's own vehicle on the basis of road information transmitted from the road information center 7 and the current location of the vehicle, the operating force of the direction instruction operation lever 8 in the corresponding direction of advance is changed. The change of the operating force of the direction instruction operation lever 8 enables such occurrence to be tactilely informed to the user via the direction instruction operation lever 8 when the user tries to operate the direction instruction operation lever 8, so driving can be suitably assisted.

Further, in this case, the system is configured so that whether the situation occurring in the direction of advance of the vehicle is due to congestion or due to an accident is notified to the user when detecting that force is given to the direction instruction operation lever 8 by the user. Therefore, the fact that the change of the operating force of the direction instruction operation lever 8 was due to congestion or due to an accident can be informed to the user and the fact that the change of the operating force of the direction instruction operation lever 8 was not due to a breakdown can be informed to the user.

Further, in this case, the system is configured so that the right direction instruction indicator 10*a* or the left direction instruction indicator 10*b* is made to blink according to a blinking cycle or a blinking color different from that in the normal state when detecting pivoting of the direction instruction operation lever 8 to a direction corresponding to the corresponding direction of advance after the change of the operating force of the direction instruction operation lever 8 in the corresponding direction of advance. Therefore, the occurrence of a situation which may obstruct the advance of one's own vehicle in the direction of advance of the vehicle can be tactilely informed to the user even when the user pivots the direction instruction operation lever 8 irrespective of the change of the operating force of the direction instruction operation lever 8.

SECOND EMBODIMENT

Figure 5:
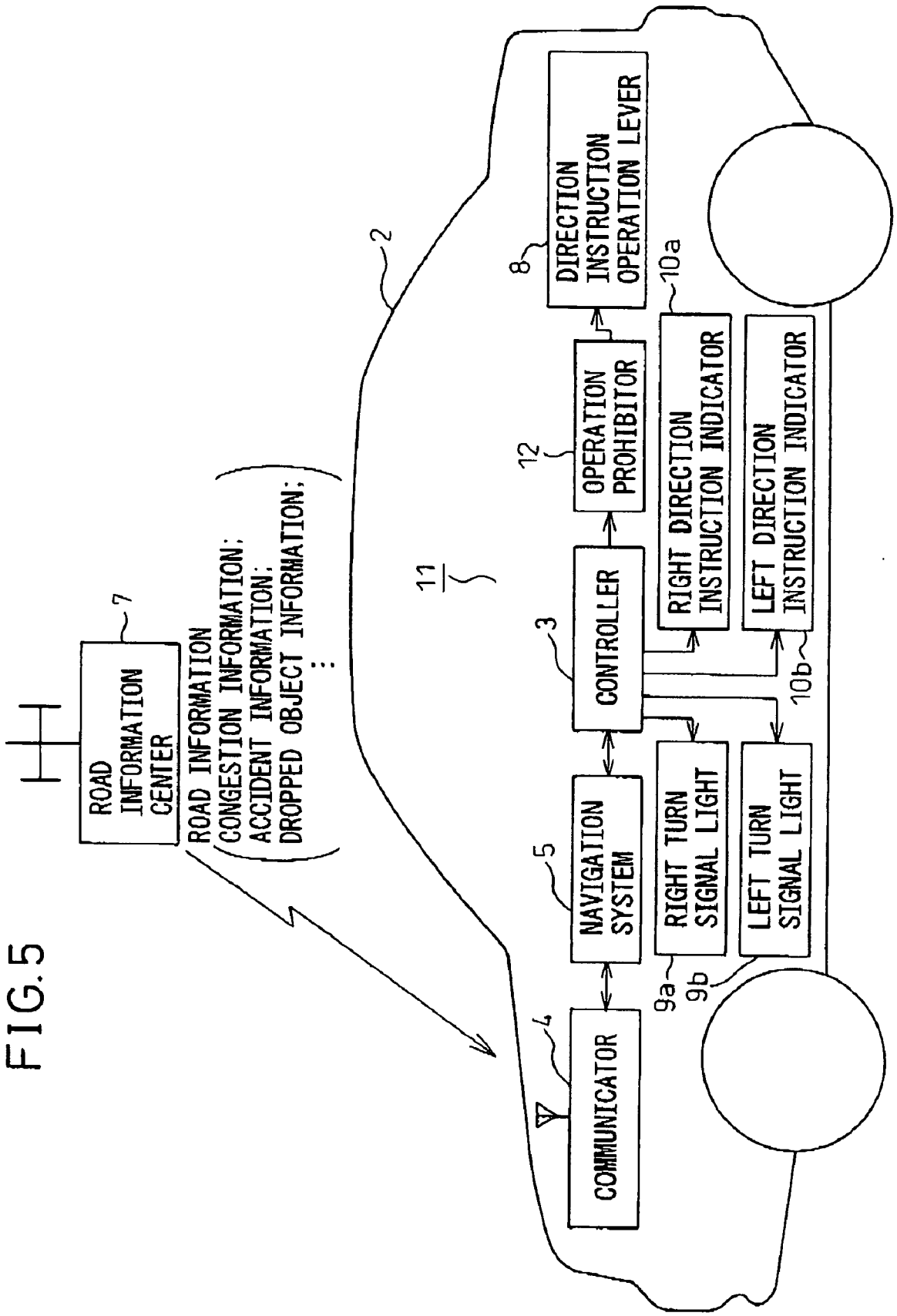
FIG. 5 is a diagram schematically showing an overall configuration of a second embodiment of the present invention.

Next, a second embodiment of the present invention will be explained by referring to FIG. 5 and FIGS. 6A and 6B. Note that portions the same as those of the first embodiment described above will not be explained. Only different portions will be explained. The first embodiment described above was configured so that the operating force of the direction instruction operation lever 8 was changed, while this second embodiment is configured so that the operation of the direction instruction operation lever 8 is prohibited.

Namely, the driving assistance system 1 is provided with an operation prohibitor 12 (i.e., the operation prohibiting means referred to in the present invention) in place of the operating force changer 6. The operation prohibitor 12 prohibits the operation of the direction instruction operation lever 8 disposed on the side of the steering wheel on the basis of an input operation prohibition signal when an operation prohibition signal is input from the controller 3.

In this case, when detecting the occurrence of a situation which may obstruct the advance of one's own vehicle in the direction of advance of the vehicle ("YES" at step S5 of FIG. 6A), the controller 3 outputs an operation prohibition signal to the operation prohibitor 6 and prohibits the operation of the direction instruction operation lever 8 in the corresponding direction of advance (step S11).

As explained above, according to the second embodiment, the driving assistance system 11 is configured so that the operation of the direction instruction operation lever 8 in the corresponding direction of advance is prohibited when detecting the occurrence of congestion, an accident, etc. in the direction of advance of one's own vehicle on the basis of the road information transmitted from the road information center 7 and the current location of the vehicle. Therefore, prohibition of the operation of the direction instruction operation lever 8, in the same way as the first embodiment described above, enables the occurrence of congestion, an accident, etc. in the direction of advance of one's own vehicle to be tactilely informed to the user via the direction instruction operation lever 8 when the user tries to operate the direction instruction operation lever 8, so driving can be suitably assisted.

Further, in this case as well, the system is configured so that when it is detected that force was given to the direction instruction operation lever 8 by the user, the user can be notified whether a situation occurring in the direction of advance of his/her vehicle is due to congestion or an accident. Therefore, whether the prohibition of the operation of the direction instruction operation lever 8 was due to congestion or due to an accident can be informed to the user, and the fact that the prohibition of the operation of the direction instruction operation lever 8 was not due to a breakdown can be informed to the user.

THIRD EMBODIMENT

Figure 7:
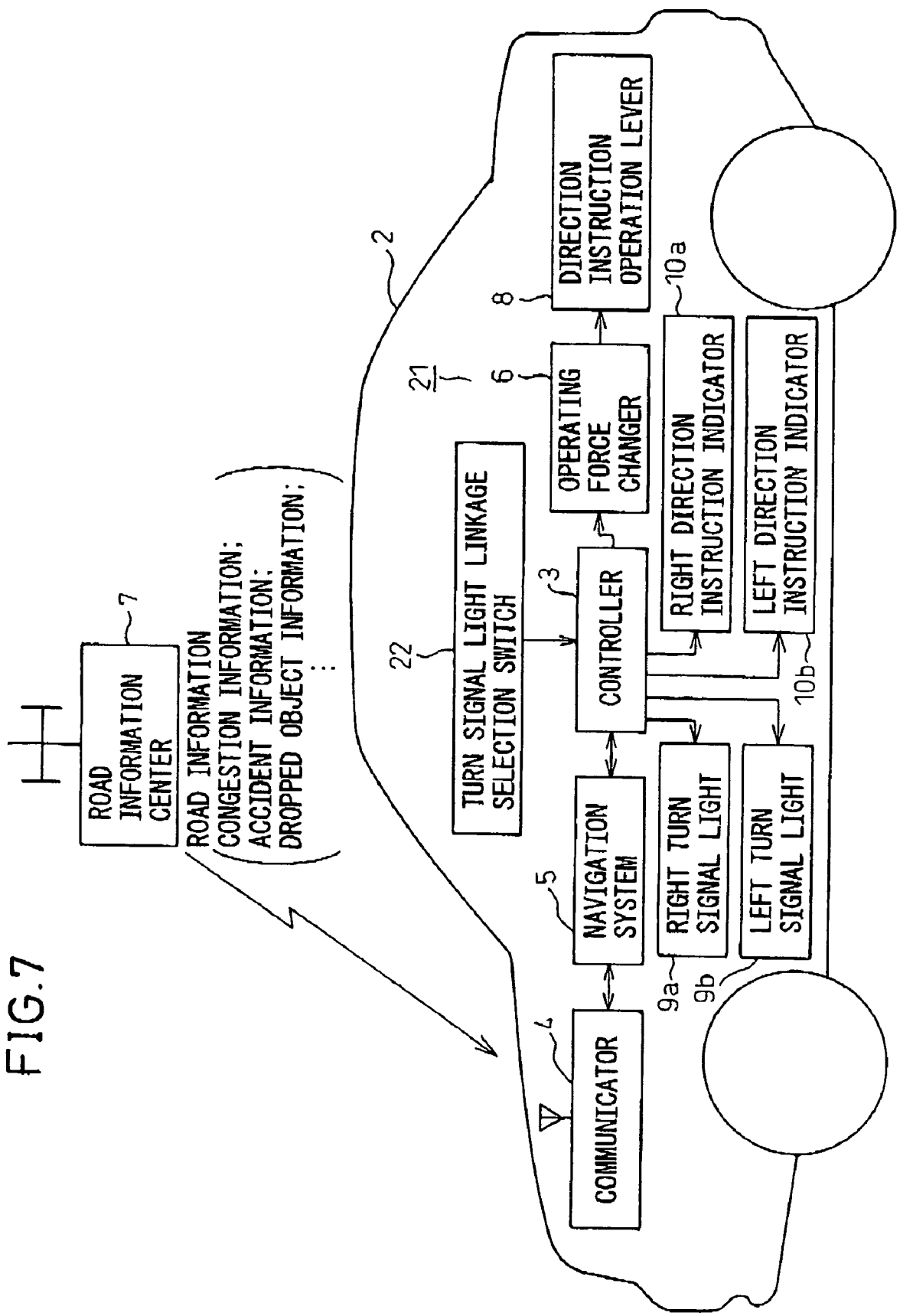
FIG. 7 is a diagram schematically showing an overall configuration of a third embodiment of the present invention.
Figure 9:
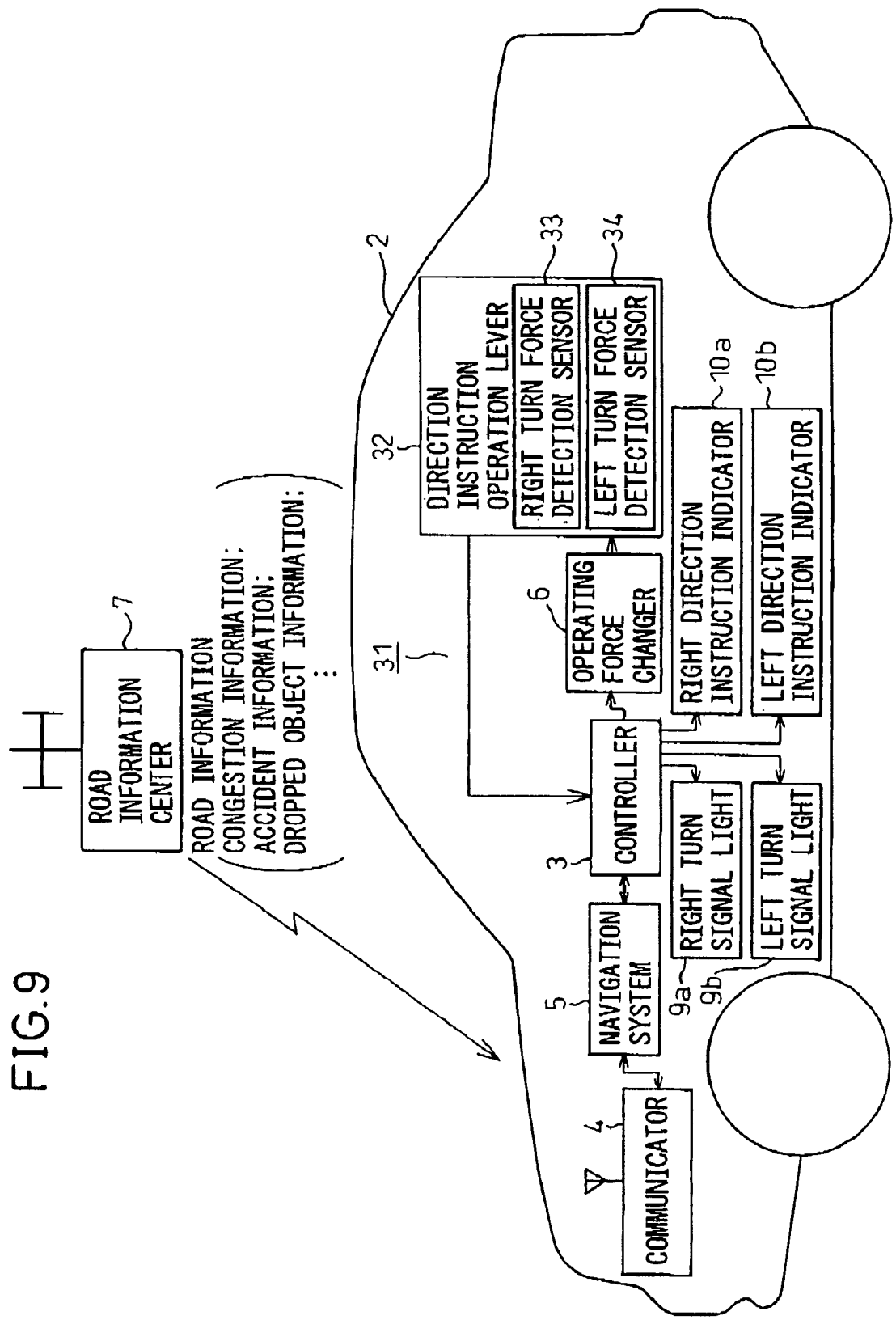
FIG. 9 is a diagram schematically showing an overall configuration of a fourth embodiment of the present invention.

Next, a third embodiment of the present invention will be explained by referring to FIG. 7 and FIGS. 8A and 8B. Note that portions the same as those of the first embodiment described above will not be explained. Only different portions will be explained. This third embodiment is configured so that the user can select linkage or nonlinkage between the operation of the direction instruction operation lever 8 and the operation of the turn signal lights 9*a* and 9*b*.

Namely, the driving assistance system 21 is provided with a turn signal light linkage selection switch 22 (i.e., the selecting means referred to in the present invention). The turn signal light linkage selection switch 22 is arranged at a position where it can be easily operated by the user along with the operation of the direction instruction operation lever 8. The user selects either the ON state (linkage state) or OFF state (nonlinkage state). When the turn signal light linkage selection switch 22 is set to the ON state, the controller 3 sets the operation of the direction instruction operation lever 8 and the operation of the turn signal lights 9a and 9b to the linkage state by electrically connecting the direction instruction operation lever 8 and the turn signal lights 9a and 9b, while when the turn signal light linkage selection switch 22 is set to the OFF state, the controller 3 sets the operation of the direction instruction operation lever 8 and the operation of the turn signal lights 9a and 9b to the nonlinkage state by electrically disconnecting the direction instruction operation lever 8 and the turn signal lights 9a and 9b.

Next, the action of the configuration described above will be explained by referring to FIGS. 8A and 8B. Note that, here, the explanation will be given of the case assuming the OFF state is set as an initial state of the turn signal light linkage selection switch 22.

The controller 3 sets the OFF state as the initial state of the turn signal light linkage selection switch 22 and sets the operation of the direction instruction operation lever 8 and the operation of the turn signal lights 9a and 9b to the nonlinkage state (step S21). Then, when detecting the change of the operating force of the direction instruction operation lever 8 in the series of processing explained in the first embodiment described above (step S22), the controller 3 judges whether or not the direction instruction operation lever 8 was pivoted in the state where the operating force of the direction instruction operation lever 8 was changed (step S23). Then, when detecting the pivoting of the direction instruction operation lever 8 ("YES" at step S23), the controller 3 does not make the right turn signal light 9a or the left turn signal light 9b blink since the operation of the direction instruction operation lever 8 and the operation of the turn signal lights 9a and 9b are set to the nonlinkage state at this point of time and judges whether or not the turn signal light linkage selection switch 22 was changed from the OFF state to the ON state by the user (step S24).

Here, when detecting that the turn signal light linkage selection switch 22 was changed from the OFF state to the ON state by the user ("YES" at step S24), the controller 3 sets the operation of the direction instruction operation lever 8 and the operation of the turn signal lights 9a and 9b to the linkage state (step S25). Then, the controller 3 judges again whether or not the direction instruction operation lever 8 was pivoted (step S26) and, when detecting the pivoting of the direction instruction operation lever 8 ("YES" at step S26), makes the right turn signal light 9a or the left turn signal light 9b blink since the operation of the direction instruction operation lever 8 and the operation of the turn signal lights 9a and 9b are set to the linkage state at this point of time (step S27).

As explained above, according to the third embodiment, the driving assistance system 21 is configured so that linkage or nonlinkage of the operation of the direction instruction operation lever 8 and the operation of the turn signal lights 9a and 9b can be selected by the turn signal light linkage selection switch 22. Therefore, when nonlinkage between the operation of the direction instruction operation lever 8 and the operation of the turn signal lights 9a and 9b is selected by the user, even if the user operates the direction instruction operation lever 8, the turn signal lights 9a and 9b will not operate (blink), so the user recognizing the occurrence of congestion, an accident, or other situation which may obstruct the advance of his/her vehicle in the direction of advance of the vehicle and therefore not turning right or left or not changing lanes yet giving erroneous information to the surroundings can be avoided in advance and safety with the surroundings can be suitably secured.

FOURTH EMBODIMENT

Next, a fourth embodiment of the present invention will be explained by referring to FIG. 9 and FIGS. 10A to 10D. Note that portions the same as those of the first embodiment described above will not be explained. Only different portions will be explained. This fourth embodiment is configured so that the operation of the turn signal lights 9a and 9b is controlled in accordance with magnitude of the amount of force and duration of application of the force given to the direction instruction operation lever.

Namely, in a driving assistance system 31, a direction instruction operation lever 32 is provided with a right turn force detection sensor 33 for detecting the force when the direction instruction operation lever 32 is pivoted in the right turn direction and a left turn force detection sensor 34 for detecting the force when the direction instruction operation lever 32 is pivoted in the left turn direction.

In this case, the direction instruction operation lever 32 is provided with a main bar 32a pivoted to directions of arrows A1 and A2 about a pivot axis 35 and a support bar 32b pivoting to directions of arrows B1 and B2 about a pivot axis 36. Here, the main bar 32a is configured inserted into the support bar 32b.

Figure 10A:
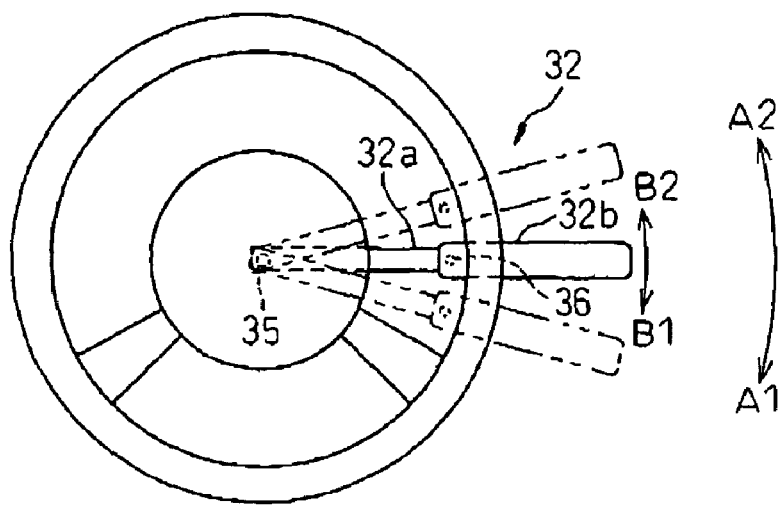
FIGS. 10A, 10B, 10C, and 10D are diagrams schematically showing modes of arrangement of a force detection sensor.
Figure 10B:
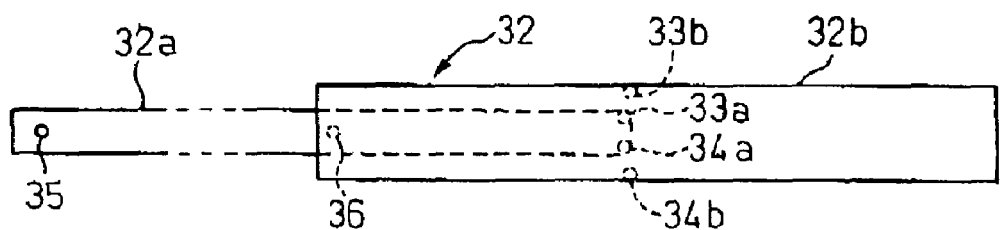
Figure 10C:
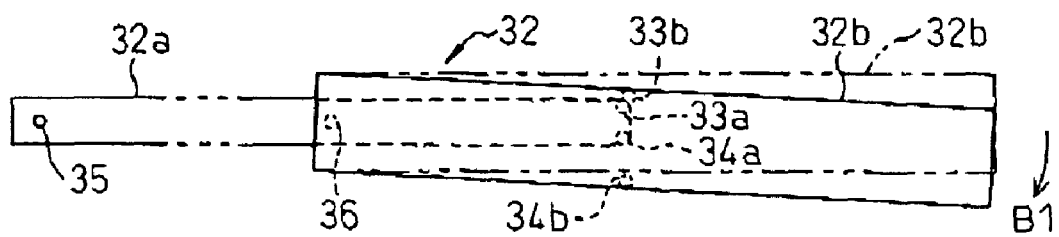
Figure 10D:
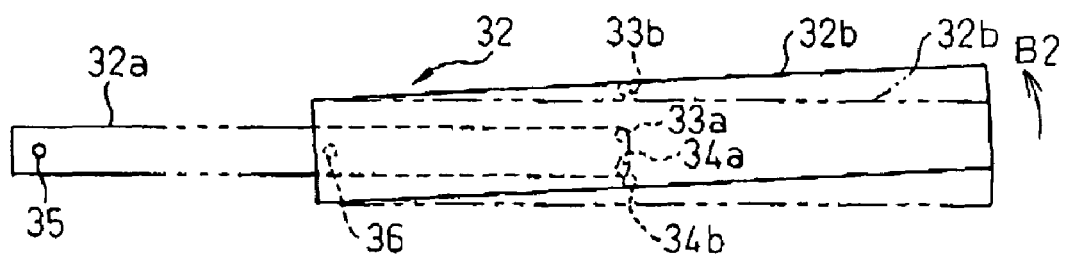

The right turn detection sensor 33 is configured by a pressure sensor 33a arranged in an upper end of the tip of the main bar 32a and a pressure sensor 33b arranged at a predetermined position of the support bar 32b. When the user applies force in a downward direction to the tip of the support bar 32b (right end in FIGS. 10B to 10D), as shown in FIG. 10C, the support bar 32b pivots to the direction of the arrow B1 from the neutral position (position shown in FIG. 10B) above the pivot axis 36 and the pressure sensors 33a and 33b contact it to thereby detect the force in the right turn direction on the basis of the pressure thereof. Further, the right turn force detection sensor 34 is configured by a pressure sensor 34a arranged in a lower end of the tip of the main bar 32a and a pressure sensor 34b arranged at a predetermined position of the support bar 32b. When the user applies force in an upward direction to the tip of the support bar 32b, as shown in FIG. 10D, the support bar 32b pivots to the direction of the arrow B2 from the neutral position about the pivot axis 36 and the pressure sensors 34a and 34b contact it to thereby detect the force in the left turn direction on the basis of the pressure thereof. In this case, these force detection sensors 33 and 34 output the detection results to the control circuit 3.

When detecting the occurrence of a situation which may obstruct the advance of one's own vehicle in the direction of advance of the vehicle in the series of processing explained in the first embodiment described above, the controller 3 outputs an operating force change signal to the operating force changer 6 and changes the operating force of the direction instruction operation lever 8 in the corresponding direction of advance, but in the present embodiment, it changes the operating force in accordance with the magnitude of the factor which may obstruct the advance of the vehicle occurring in the direction of advance of the vehicle. Specifically explaining this, the controller 3 changes the operating force to become large when the size of the congestion, accident, etc.

occurring in the direction of advance of the vehicle is large, while changes the operating force to become small when the size of congestion, accident, etc. occurring in the direction of advance of the vehicle is small. Further, the controller 3 speeds up the blinking cycle or changes the blinking color in accordance with the amount of force and the duration of application and makes the turn signal lights 9a and 9b blink.

Accordingly, in the above-described configuration, when the size of congestion, accident, etc. occurring in the direction of advance of the vehicle is large, the operating force is changed to become large and the amount of the force given to the direction instruction operation lever 32 by the user will become large or the duration of application will become long along with that. The controller 3 will make the turn signal lights 9a and 9b blink while speeding up the blinking cycle or changing the blinking color in accordance with the large amount of force and long duration of application. On the other hand, when the size of congestion, accident, etc. occurring in the direction of advance of the vehicle is small, the operating force is changed to become small, and the amount of the force given to the direction instruction operation lever 32 by the user will become small or the duration of application will become short along with that. The controller 3 will make the turn signal lights 9a and 9b blink while slowing down the blinking cycle or changing the blinking color in accordance with the small amount of force and short duration of application.

As explained above, according to the fourth embodiment of the present invention, the driving assistance system 31 is configured so that the operating force is changed in accordance with the magnitude of the size of congestion, accident, etc. occurring in the direction of advance of one's own vehicle and the turn signal lights 9a and 9b are made to blink while changing the blinking cycle or the blinking color in accordance with the amount of force given to the direction instruction operation lever 31 by the user and the duration of application, therefore the magnitude of the size of congestion, accident, etc. can be informed to the surroundings.

OTHER EMBODIMENTS

The present invention is not limited to only the embodiments described above and can be modified or extended as follows. For example, it is not limited to congestion and accidents. The invention may also be applied to a case where an object (obstructing driving) is dropped onto the road as well. Further, the invention is not limited to a configuration making the display device of the navigation system 5 display the nature of the situation (for example, congestion or an accident) occurring in the direction of advance of one's own vehicle and making the audio output device output the nature of the situation by audio guidance. It may be configured so that the nature of the situation occurring in the direction of advance of the vehicle is displayed on a dedicated display device or output from a dedicated audio output device by providing such a dedicated display device and dedicated audio output device.

What is claimed is:

1. A driving assistance system provided with:
a road information receiving function unit for receiving road information transmitted from a road information center or another vehicle;
a current location specifying function unit for specifying the current location of one's own vehicle;
an operating force change function unit able to change the operating force of a direction instruction operation lever; and
a control function unit for judging whether or not a situation which may obstruct the advance of the vehicle has occurred in an direction of advance of the vehicle on the basis of the road information transmitted from the road information center or the other vehicle and received by said road information receiving function unit and the current location of the vehicle specified by said current location specifying function unit and changing the operating force of the direction instruction operation lever in the corresponding direction of advance by said operating force change function unit when detecting the occurrence of such a situation.

2. A driving assistance system as set forth in claim 1, wherein said control function unit judges whether or not force was given to the direction instruction operation lever by the user after said operating force change function unit changes the operating force of the direction instruction operation lever in the corresponding direction of advance and makes a notifying function unit notify the user of the nature of the situation which may obstruct the advance of the vehicle occurring in the direction of advance of the vehicle therefrom when detecting that force was given to the direction instruction operation lever by the user.

3. A driving assistance system as set forth in claim 1, wherein said control function unit judges whether or not the direction instruction operation lever was pivoted to a direction corresponding to the corresponding direction of advance after said operating force change function unit changes the operating force of the direction instruction operation lever in the corresponding direction of advance and makes direction instruction indicators blink by a blinking cycle or a blinking color different from that in a normal state when detecting the pivoting of the direction instruction operation lever to the direction corresponding to the corresponding direction of advance.

4. A driving assistance system as set forth in claim 1, wherein said control function unit can change the operating force in accordance with a degree of importance or a degree of emergency of a factor which may obstruct the advance of the vehicle occurring in the direction of advance of the vehicle.

5. A driving assistance system provided with:
a road information receiving function unit for receiving road information transmitted from a road information center or another vehicle;
a current location specifying function unit for specifying the current location of one's own vehicle;
an operation prohibition function unit able to prohibit the operation of a direction instruction operation lever; and
a control function unit for judging whether or not a situation which may obstruct the advance of the vehicle has occurred in an direction of advance of the vehicle on the basis of the road information transmitted from the road information center or the other vehicle and received by said road information receiving function unit and the current location of the vehicle specified by said current location specifying function unit and making said operation prohibition function unit prohibit the operation of the direction instruction operation lever in the corresponding direction of advance when detecting the occurrence of such a situation.

6. A driving assistance system as set forth in claim 5, wherein said control function unit judges whether or not force was given to the direction instruction operation lever by the user after said operation prohibition function unit prohibits the operating force of the direction instruction operation lever in the corresponding direction of advance and makes a notifying function unit notify the nature of the situation which may obstruct the advance of the vehicle occurring in the direction of advance of the vehicle when detecting that force was given to the direction instruction operation lever by the user.

7. A driving assistance system as set forth in claim 1, wherein:
   the system is further provided with a selection function unit able to select nonlinkage or linkage between the operation of the direction instruction operation lever and the operation of the turn signal lights by the user;
   said control function unit sets the operation of the direction instruction operation lever and the operation of the turn signal lights to a nonlinkage state when detecting the selection of nonlinkage between the operation of the direction instruction operation lever and the operation of the turn signal lights by the user by said selection function unit, while sets the operation of the direction instruction operation lever and the operation of the turn signal lights to the linkage state when detecting the selection of the linkage between the operation of the direction instruction operation lever and the operation of the turn signal lights by the user by said selection function unit.

8. A driving assistance system as set forth in claim 1, wherein:
   the system is further provided with a force detection function unit for detecting the magnitude of an amount of force and duration of application of force given to the direction instruction operation lever by the user; and
   said control function unit changes the operating force in accordance with the magnitude of a factor which may obstruct the advance of the vehicle occurring in the direction of advance of the vehicle and controls the operation of the turn signal lights on the basis of the result of detection by said force detection function unit.

* * * * *